C. W. PAGE.
WAGON BRAKE.
APPLICATION FILED SEPT. 3, 1909.
948,246.
Patented Feb. 1, 1910.
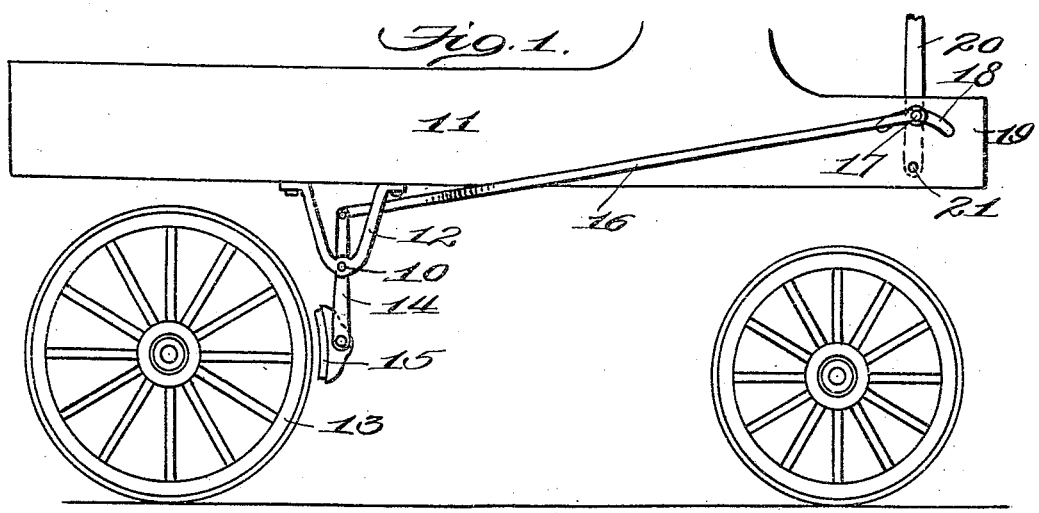
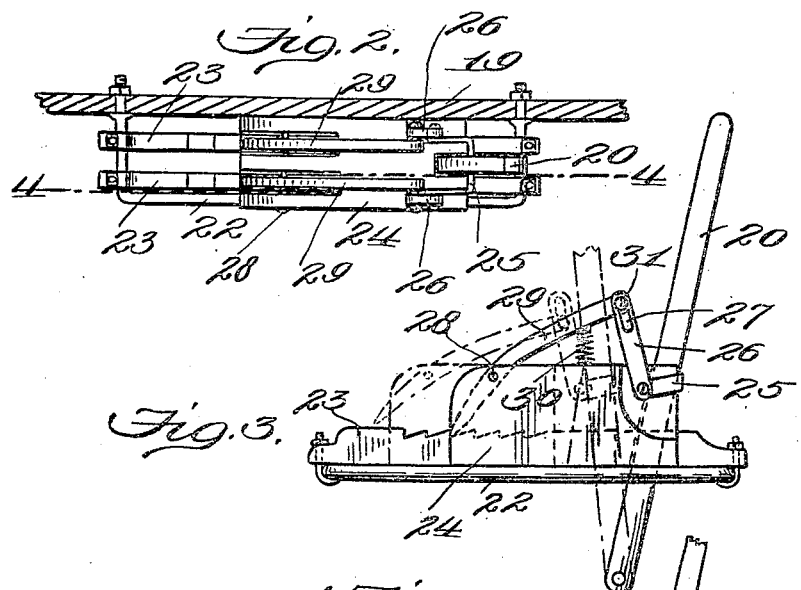
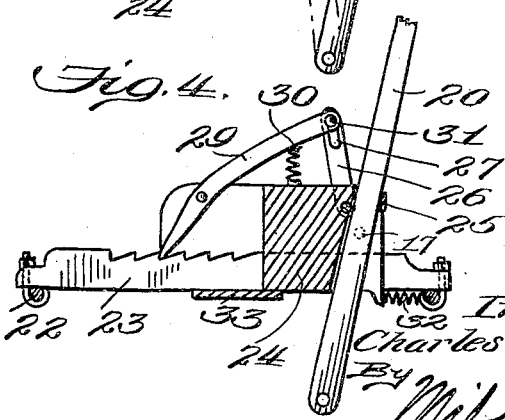
Witnesses:
A. R. Walton
F. A. Barron
Inventor
Charles W. Page
By Milo B. Stevens & Co.
Attys

UNITED STATES PATENT OFFICE.

CHARLES WILLIAM PAGE, OF CATHLAMET, WASHINGTON.

WAGON-BRAKE.

948,246.  Specification of Letters Patent.  Patented Feb. 1, 1910.

Application filed September 3, 1909. Serial No. 516,099.

*To all whom it may concern:*

Be it known that I, CHARLES WILLIAM PAGE, a citizen of the United States, residing at Cathlamet, in the county of Wahkiakum and State of Washington, have invented certain new and useful Improvements in Wagon-Brakes, of which the following is a specification.

My invention relates to wagon brakes, and more particularly to an improved mechanism for operating the brake connections, and my object is to provide a simple and durable construction whereby the connections may be operated and released by hand or foot.

Other objects, and the advantages, of my present invention, will appear in the course of the following description, in which reference is made to the accompanying drawings, forming a part of this specification, and in which, Figure 1, is a side elevation of a portion of a wagon provided with my improved mechanism, and illustrating the usual brake connections. Fig. 2, is a plan view of my improved brake mechanism. Fig. 3, is a side elevation thereof, and Fig. 4, is a longitudinal section therethrough on line 4—4 of Fig. 2.

Referring to the drawings, and particularly to Fig. 1, which illustrates the ordinary brake connections, the brake shaft 10 is journaled transversely beneath the body 11 of the vehicle, through depending brackets 12 forwardly of the rear wheels 13, and to said shaft is intermediately secured a lever 14, extending vertically and provided with a brake shoe 15 upon its lower end. The upper end of brake lever 14 is pivotally secured to the rear end of the forwardly extending brake rod 16 which, in turn, is pivotally secured at its forward end to an arm 17, extending through a horizontal curved slot 18 in the side board 19, from the brake operating lever 20 at a point above the pivot 21 of the latter upon said side board.

The brake operating lever 20 works, upon its pivot 21, within a horizontal U-shaped frame 22, the extensions of which are secured through the side board 19. Arranged longitudinally upon, and secured to, said frame 22, parallel with side board 19, and spaced apart and straddling the lever 20, are a pair of rack bars 23. Mounted to slide upon the rack bars 23, is a block 24, which is connected at its forward end to the brake operating lever 20, by a strap 25 passing around the latter above its arm 17, and secured at its ends to the former by means which also serve to secure thereto, the lower ends of upwardly and rearwardly extending posts 26 provided with longitudinal slots 27 in their upper ends.

Intermediately pivotally mounted at 28 at the rear of block 24 within slotted portions thereof, are curved pawls 29, the rear ends of which engage the rack bars 23 by the action of springs 30 upon the upper surface of block 24, pressing upwardly against the forward ends of said pawls, which forward ends have angular pins 31 projecting through the guide slots 27 of posts 26. Thus when said block is forced forwardly by foot pressure against the rear end thereof, to set the brake, the pawls 29 will, through the action of springs 30, engage the rack bars 23 to hold the said block when released. This may be accomplished in a similar manner by thrusting forward, by hand, the lever 20. When it is desired to release the brake the foot is employed to depress the forward ends of pawls 29, thus disengaging them from rack bars 23, and the block will be moved rearwardly by means of a spring 32 connecting one end of the block and the corresponding end of frame 22. A plate 33, secured upon the lower surface of the block 24 and below and across the rack bars 23, serves to hold the said block thereon.

I claim—

In a brake operating mechanism, the combination of a rack bar, a foot operating block mounted to slide thereon, a pawl intermediately pivoted in said block and engaging said rack with one end, a spring bearing against the opposite end of said pawl, said pawl being releasable from said rack by pressure upon its last named end against the tension of said spring, a hand operating lever, connections between said lever and the brake shaft, and a connection between said lever and said block comprising a strap loosely extending about the former and having its ends secured to the latter.

In testimony whereof I have affixed my signature, in presence of two witnesses.

CHARLES WILLIAM PAGE.

Witnesses:
J. BRUCE POLWARTH,
JOHN LAMONT.